United States Patent [19]

Hovorak

[11] 4,014,294
[45] Mar. 29, 1977

[54] CATTLE OILER

[76] Inventor: William P. Hovorak, 1023 W. 16th, Wellington, Kans. 67152

[22] Filed: Mar. 17, 1976

[21] Appl. No.: 667,490

[52] U.S. Cl. ............................................. 119/157
[51] Int. Cl.² ...................................... A01K 29/00
[58] Field of Search .................................. 119/157

[56] References Cited
UNITED STATES PATENTS

| | | | |
|---|---|---|---|
| 1,270,425 | 6/1918 | Lowes | 119/157 |
| 1,327,088 | 1/1920 | Curttright | 119/157 |
| 2,766,726 | 10/1956 | Duff | 119/157 |

*Primary Examiner*—Hugh R. Chamblee
*Attorney, Agent, or Firm*—John H. Widdowson; Edwin H. Crabtree

[57] ABSTRACT

A cattle oiler for the treating of livestock. The oiler having an angular rubbing tube and a vertical rubbing tube communicably connected to an oil reservoir. The rubbing tubes are positioned on angular and vertical supports wherein an animal can rub against both the vertical rubbing tube and angular rubbing tube, thereby treating both its sides and back with oil. The rubbing tubes are tiltably mounted on their supports. When the tubes are tilted a valve inside each tube is opened and oil from the oil reservoir is supplied to the surface of the rubbing tube.

11 Claims, 11 Drawing Figures

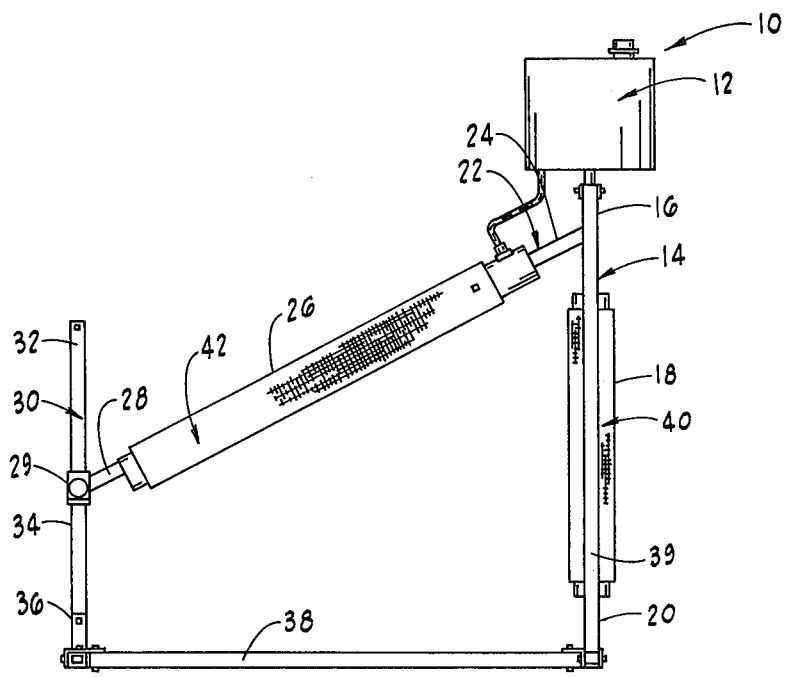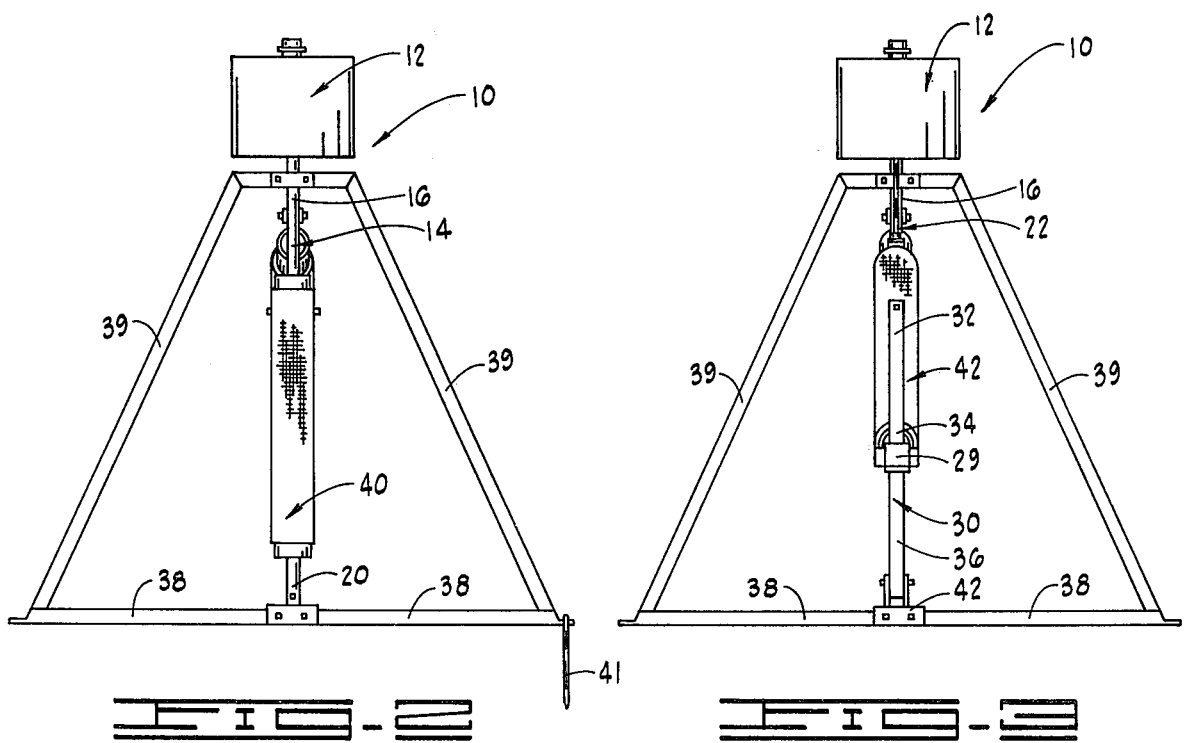

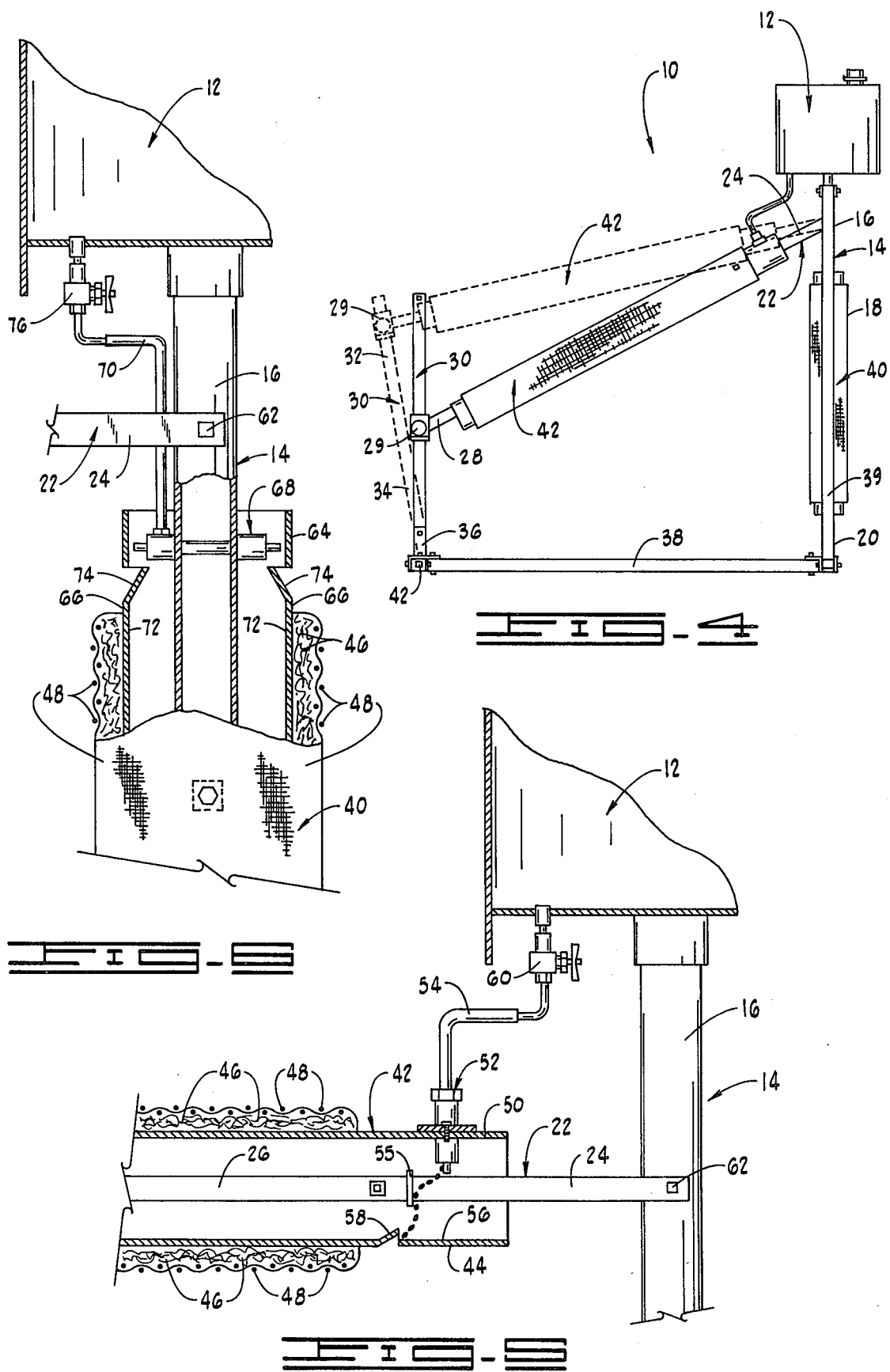

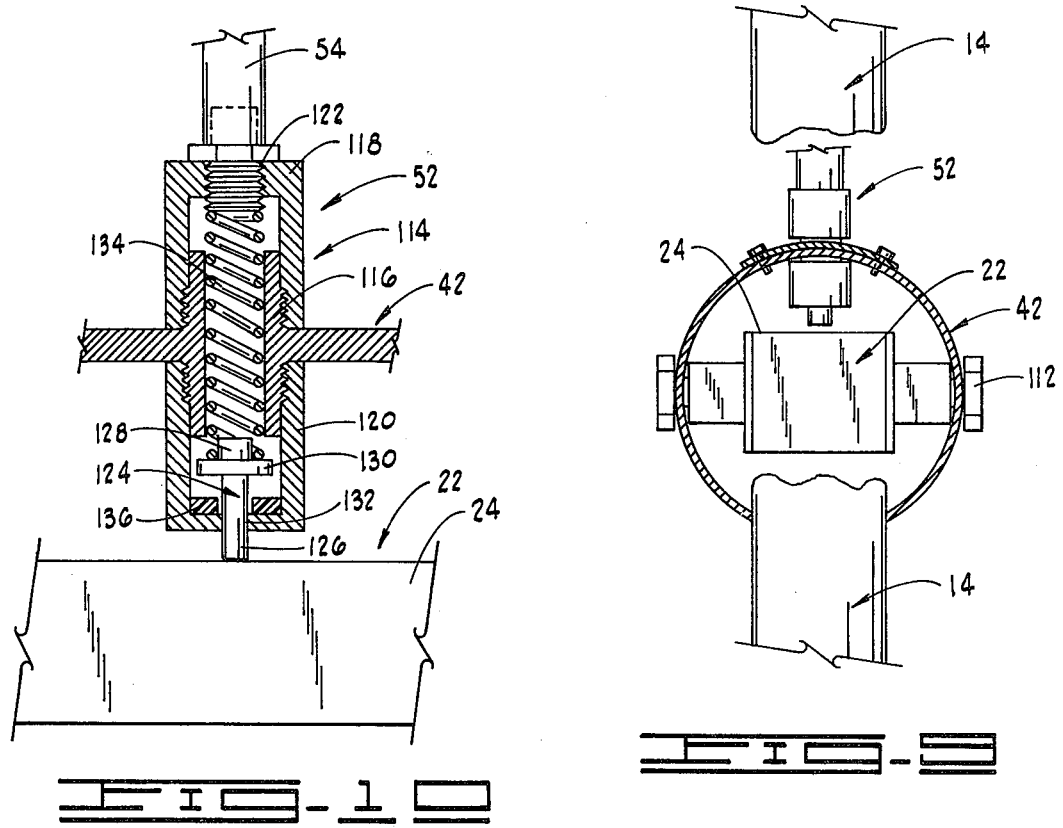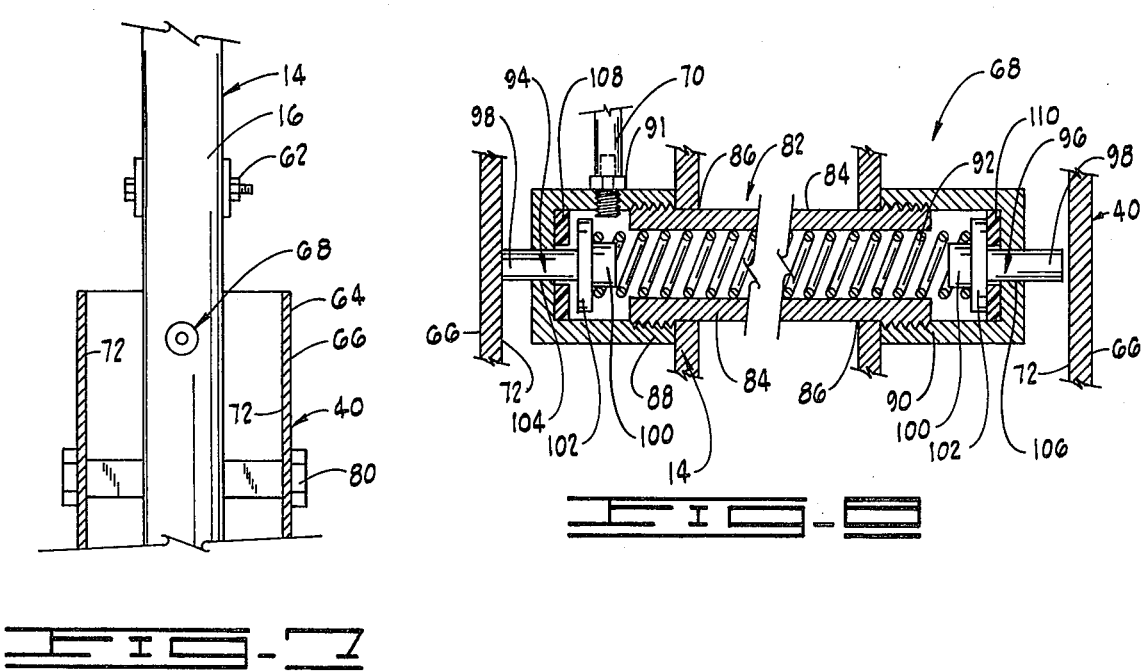

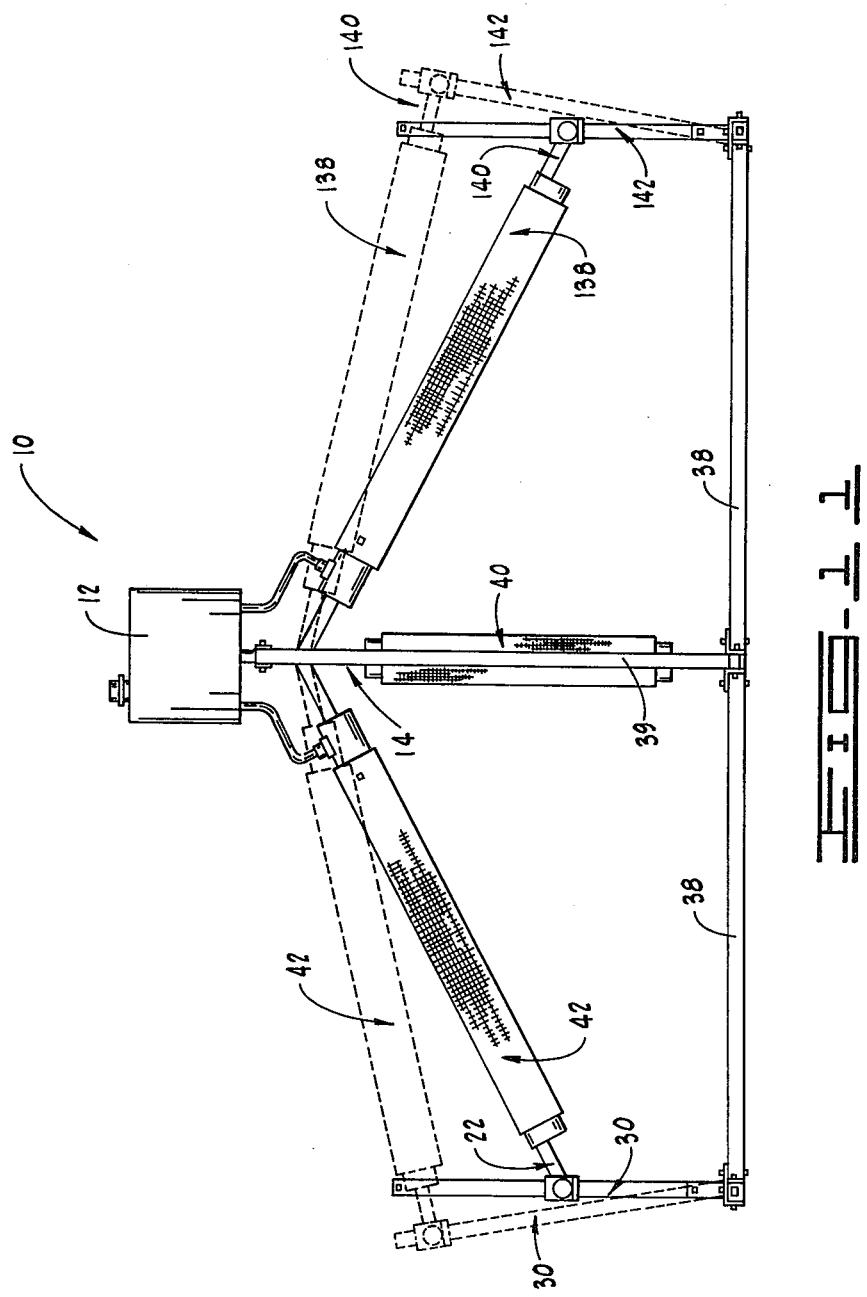

4,014,294

CATTLE OILER

BACKGROUND OF THE INVENTION

This invention relates generally to the treating of livestock and more particularly but not by way of limitation to a cattle oiler for supplying oil, insecticides or the like to the skin of the animal.

Heretofore numerous types of livestock treaters having rubbing tubes are known in the prior art for dispensing treating fluids such as oil, insecticides or mixtures thereof onto the skin of livestock such as hogs, cattle, etc. However, the prior art devices are deficient in that they are not always operated properly by the rubbing motion of the livestock. For instance, some of the prior art devices require vertical motion of a rubbing surface to activate a mechanism to dispense additional fluid onto the rubbing surface to replace that which is rubbed away. With this type of device the rubbing surface often becomes dry because the animal rubbing does not always produce the vertical motion of the rubbing surface that is necessary to cause the fluid to be dispensed and hence the effectiveness of the treater is limited.

Other known prior art livestock treaters require an oscilating motion of the rubbing surface to cause the fluid to be dispensed onto the rubbing surface. With these prior art rubbing devices the animal is likely to push against the rubbing surface and not release it until he is through scratching therefore the rubbing surface is not moved in the oscilating manner that is required to cause the treating fluid to be dispensed.

Also there are other prior art livestock treaters which have a rotating rubbing surface which when rotated causes fluids to be dispensed onto the animal. With this type of livestock treater if the animal rubs against the rubbing surface without sufficiently rotating the rub tube no fluid is dispensed onto the rubbing surface and the rubbing surface soon becomes dry and the device is ineffective.

SUMMARY OF THE INVENTION

The subject invention includes a vertical and angular rubbing tube that are easily tilted by an animal thereby allowing oil, insecticides, or the like to flow from the reservoir onto the rubbing surface for replenishing the liquid that is rubbed away by the animal.

The reservoir continues to supply oil to the rubbing surface irrespective of the motion of the animal as long as the rubbing tube is tilted with respect to its normal suspended position.

The vertical rubbing tube and the angular rubbing tube can be used separately by the animal or the animal can use both of the rubbing tubes at the same time.

The angular rubbing tube is slidably mounted at one end on a vertical slide support. The angular rubbing tube therefore can be raised and lowered as the back of the animal is rubbed against the surface of the angular rubbing tube. Also the angular rubbing tube in its untilted position is angled downwardly thereby allowing contact of animals of various heights.

The vertical rubbing tube includes an oil valve wherein the valve will open supplying oil thereto when the rubbing tube is tilted in opposite directions by the animal. Also the angular rubbing tube includes a separate oil valve wherein the valve is opened when the rubbing tube is tilted by raising the tube on the angular support.

An alternate embodiment of the cattle oiler includes an additional angular rubbing tube so that the oiler can be used by more than one animal at the same time.

The cattle oiler includes a vertical and angular support. Vertical and angular rubbing tubes are mounted on the supports. Oil valves are mounted on the vertical support and the angular support. When the rubbing tubes are tilted they contact and open the oil valves and oil is supplied from a reservoir mounted on top of the vertical support to the surface of the rubbing tubes thereby supplying oil to the skin of the animal as he rubs against the rubbing tubes.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 is a side view of the cattle oiler.
FIG. 2 is a front view of the cattle oiler.
FIG. 3 is a rear view of the cattle oiler.
FIG. 4 is a side view of the cattle oiler showing in dotted lines the angular rubbing tube in a raised position.
FIG. 5 is a partial view showing a cutaway of the upper portion of the angular rubbing tube and the oil reservoir.
FIG. 6 is a partial view showing a cutaway section of the upper portion of the vertical rubbing tube and the oil reservoir.
FIG. 7 is a partial view of the upper portion of the vertical rubbing tube at 90° from the partial view shown in FIG. 6.
FIG. 8 is an enlarged cross sectional view of the oil valve shown in FIG. 6.
FIG. 9 is an end view of the upper portion of the angular rubbing tube and oil valve.
FIG. 10 is an enlarged cross sectional view of the oil valve shown in FIG. 9.
FIG. 11 is an alternate embodiment of the cattle oiler disclosing an additional angular rubbing tube.

DETAILED DESCRIPTION OF THE DRAWINGS

In FIG. 1 the cattle oiler is designated by general reference numeral 10. The oiler 10 includes an oil reservoir 12 mounted on a vertical support 14. The support 14 includes an upper portion 16, a center portion 18, and a lower portion 20. An angular support 22 is pivotally attached to the upper portion 16 of the support 14. The angular support 22 includes an upper portion 24, a center portion 26, and a lower portion 28. The lower portion 28 of the angular support 22 includes a hollow end piece 29 which is slidably mounted on a vertical slide support 30. The vertical slide support 30 includes an upper portion 32, a center portion 34, and a lower portion 36. While the angular support 22 is constructed to be raised and lowered at its lower portion 28 on the vertical slide support 30, it is understood that in the alternative the angular support 22 could be rigidly attached to both the vertical support 14 and the vertical slide support 30.

Horizontal bracing 38 is attached to the lower portion 20 of the vertical support 14 and to the lower portion 36 of the vertical support 30. Vertical bracing 39 is attached to the horizontal bracing 38 and to the upper portion 16 of the vertical support 14. The bracing 38 and 39 are used to rigidly support the oiler 10 on the ground surface.

A hollow cylindrical vertical rubbing tube 40 is tiltably mounted on the vertical support 14. A hollow cylindrical angular rubbing tube 42 is tiltably mounted on the angular support 22. The rubbing tubes 40 and 42 are disposed around the center portion 18 and 26 of the vertical support 14 and the angular support 22.

In FIG. 2 a front view of the oiler 10 is shown. In this view the vertical bracing 39 and the horizontal bracing 38 can be seen disposed on both sides of the vertical support 14 and the vertical rubbing tub 40. A pin 41 is shown attached to the corner of the bracing 38 and 39. The pin 41 is driven into the ground surface for holding the oiler 10 in place.

FIG. 3 discloses a rear view of the oiler 10. In this view the bottom portion 36 of the slide support 30 can be seen pivotally attached to a U-shaped hinge 42 which is mounted to the bracing 38.

In FIG. 4 the angular support 22 and the angular rubbing tube 42 is shown in dotted lines in a raised position. When the animal rubs against the rubbing tube 42, the tube 42 is raised on the angular support 22 by the end piece 29 moving upward and outward on the vertical slide support 30. When the angular support 22 is raised, the vertical slide support 30 pivots on the hinge 42 and moves outwardly allowing the angular support 22 and rubbing tube 42 to be moved upward thereby allowing the animal to be exposed to a greater surface area of the rubbing tube 42 so that oil can be placed thereon as the rubbing tube 42 is held in a tilted position.

In FIG. 5 an enlarged partial view of the upper portion 16 of the vertical support 14 and the upper portion 24 of the angular support 22 is shown. Also an enlarged cross section of the angular rubbing tube 42 is shown. An outer circumference 44 of the rubbing tube 42 is covered with a layer of porous material 46 that is enclosed in an open mesh material 48. Preferably, the porous material 46 is a fabric of fibrous material such as jute, hemp, flax, or acrylic fibers or any suitable equivalent which can be saturated with oil or the like and contain the oil therein. In practice, acrylic materials sometimes used for indoor-outdoor carpeting is successfully used and such is preferred. The mesh covering material 48 has a lattice-like appearance such as screen wire or expanded metal screen or any suitable equivalent. The mesh covering material 48 serves to retain the porous material 46 and to provide a scratching surface or rubbing surface for the animal to rub against.

Attached to the upper portion 50 of the rubbing tube 42 is an oil valve 52. When the rubbing tube 42 is raised on the angular support 22, the oil valve 52 is opened and oil is fed from the reservoir 12 via a conduit 54 through the valve 52 and onto the angular support 22. The oil runs down the angular support 22 until it contacts an annular drip ring 55 around the circumference of the support 22. The oil is then deflected and drips down onto an inner circumference 56 of the rubbing tube 42 and out an indention vent 58. The oil then feeds down the outer circumference 44 of the tube 42 and into the porous material 46.

The conduit 54 includes a shut off valve 60 which is used to turn off the oil supply from the reservoir 12 when the oiler 10 is being serviced. It should also be noted in this view that the upper portion 24 of the angular support 22 is pivotally attached to the vertical support 14 by a bolt assembly 62.

In FIG. 6 an enlarged partial view of the upper portion 16 of the vertical support 14 and an upper portion 64 of the vertical rubbing tube 40 is shown. In this view a partial cross section of the rubbing tube 40 is seen having an outer circumference 66 covered with the porous material 46 and the open mesh material 48 as described under the description of FIG. 5.

An oil valve 68 is attached to the upper portion 16 of the vertical support 14. The valve 68 is supplied with oil from the reservoir 12 via a conduit 70. When the rubbing tube 40 is tilted on the vertical support 14, a portion of an inner circumference 72 of the rubbing tube 40 contacts the oil valve 68 and it is opened. Indention vents 74 in the tube 40 are disposed directly below the oil valve 68. Therefore when the oil valve 68 is opened by tilting the rubbing tube 40, the oil drips into the indention vent 74 and down along the outer circumference 66 of the tube 40 and into the porous material 46.

The conduit 70 includes a shut off valve 76 similar to the shut off valve 60 for closing the oil supply from the reservoir 12 when the cattle oiler 10 is being serviced.

FIG. 7 is a cross sectional view of the upper portion 64 of the vertical rubbing tube 40, but at a 90° angle from the view of the rubbing tube 40 shown in FIG. 6. In this view the rubbing tube 40 can be seen suspended on the vertical support 14 by a bolt assembly 80. By tilting the suspended rubbing tube 40 on the bolt assembly 80, the inner circumference 72 of the rubbing tube 40 contacts the oil valve 68 which in this figure is shown in a front view.

In FIG. 8 a cross section of the oil valve 68 is shown in detail. The valve 68 includes a valve housing 82 having a threaded center portion 84 extending through apertures 86 in the sides of the vertical support 14. Threadably attached to the center portion 84 are valve housing end portions 88 and 90. The threaded end portion 88 of the housing 82 includes an aperture 91 for receiving the conduit 70 and supplying the valve housing 82 with oil from the reservoir 12.

Slidably mounted in the valve housing 82 is a coil spring 92 held in compression and against a pair of plungers 94 and 96. The plungers 94 and 96 include a first end portion 98, a second end portion 100, and a flange portion 102 therebetween.

The first end portion 98 of the plungers 94 and 96 extends outwardly from the valve housing 82 through apertures 104 and 106.

The second end portion 100 of the plungers 94 and 96 is biased against the ends of the coil spring 92. The coil spring 92 holds the valve 68 in a closed position by urging the flange portion 102 against gaskets 108 and 110 mounted around the apertures 104 and 106.

In use when the vertical rubbing tube 40 is tilted on the bolt assembly 80 attached to the vertical support 14, the inner circumference 72 of the rubbing tube 40 contacts the first end portion 98 of either the plunger 94 or 98 depending on the direction the rubbing tube 40 is tilted. In FIG. 8 the inner circumference 72 of the rubbing tube 40 contacts the plunger 94 and urges it inward into the housing 82 and compressing the coil spring 92. At this time the flange portion 102 is moved away from the gasket 108 thereby opening the oil valve 68 and allowing the oil in the valve housing 82 to flow around the first end portion 98 and out the aperture 104. As mentioned under the description of FIG. 6 the oil then drops through the indention vents 94 and into the porous material 46.

When the animal has finished rubbing against the rubbing tube 40 the tube 40 returns to its normal suspended position and the coil spring 92 urges the plunger 94 forward in the valve housing 82 thereby closing the oil valve 68.

In FIG. 9 an end view of the angular support 22 and the angular rubbing tube 42 is seen. In this view the rubbing tube 42 is pivotally attached to the angular support 22 by a bolt assembly 112. Prior to using the rubbing tube 42, the upper portion 24 of the angular support 22 is disposed adjacent the oil valve 52 which is held in a closed position. Then the angular rubbing tube 42 is tilted upwardly the upper portion 24 of the angular support 22 moves upward contacting the oil valve 52 and opening the oil valve 52.

In FIG. 10 a detailed cross section of the oil valve 52 attached to the angular rubbing tube 42 is shown. The valve 52 includes a valve housing 114 having a threaded center portion 116, a first end portion 118, and a second end portion 120. The first end portion 118 includes a threaded aperture 122 for receiving the conduit 54 communicably connected for feeding oil from the reservoir 12 to the valve housing 114.

A plunger 124 is mounted inside the second end portion 120 of the valve housing 114. The plunger 124 includes a first end portion 126, a second end portion 128, and a flange portion 130 therebetween.

The first end portion 126 extends outwardly through an aperture 132 in the second end portion 120 of the valve housing 114.

A coil spring 134 is mounted in the housing 114 and held in compression therein. One end of the spring 134 is disposed against the second end portion 128 of the plunger 124 and urges the flange portion 130 against a gasket 136 mounted around the aperture 132. The flange portion 130 is biased against the gasket 136 and holds the oil valve 52 in a closed position. When the upper portion 24 of the angular support 22 is raised, the upper portion 24 contacts the first end portion 126 of the plunger 124 and urges the plunger 124 inwardly into the valve housing 114. At this time the flange 130 of the plunger 124 is moved off its seat against the gasket 136 and the oil valve 52 is opened and oil flows around the first end portion 126 and through the aperture 132.

In FIG. 11 an alternate embodiment of the cattle oiler 10 is shown, wherein an additional angular rubbing tube 138 is tiltably mounted on an angular support 140. The angular support 140 is pivotally attached to the vertical support 14 and at the other end slidably mounted on a vertical slide support 142. The added vertical slide support 142 is held in position by horizontal bracing 38.

The added angular rubbing tube 138 is communicably connected to the oil reservoir 12 and provides the added feature of allowing more than one animal to use the cattle oiler 10 at the same time.

In operation the reservoir 12 of the cattle oiler 10 is filled with oil, insecticides, or any other liquid which is desired by the user to be applied to livestock. When the vertical rubbing tube 40 and the angular rubbing tube 42 are held in their normal suspended positions, the oil valves 52 and 68 are in a closed position and no liquid will flow from the reservoir 12 onto the surface of the rubbing tubes 40 and 42 until they are tilted. When an animal rubs against the exterior surface of the rubbing tubes 40 and 42, the valves 52 and 68 are opened and the liquid flows into the porous material surrounding the rubbing tubes and is transferred to the skin of the animal. After the cattle oiler 10 has been in operation a short time the porous material 48 on the exterior of the rubbing tubes 40 and 42 will become saturated with the liquid so that as the animals rubs against the rubbing surface the liquid which is rubbed away onto their skin is replenished. It is to be noted that as long as the animal pushes against the rubbing tubes 40 and 42, the liquid is continually dispensed onto the rubbing surface.

Changes may be made in construction and arrangement of the parts or elements of the embodiments as disclosed herein without departing from the spirit or scope of the invention as defined in the following claims.

I claim:

1. A cattle oiler for the treating of livestock, the oiler comprising:

a vertical support having an upper portion, a center portion, and a lower portion;

an angular support having an upper portion, a center portion, and a lower portion, the upper portion of said angular support attached to the upper portion of said vertical support, said angular support extending outwardly and downwardly from said vertical support;

a vertical slide support, the lower portion of said angular support mounted on said slide support;

first rubbing means tiltably mounted on said vertical support;

second rubbing means tiltably mounted on said angular support;

an oil reservoir mounted on said vertical support;

first valve means attached to the upper portion of said vertical support and disposed adjacent said first rubbing means, said first valve means communicably connected to said reservoir for feeding oil therefrom to said first rubbing means, said first valve means held in a closed position, said first valve means in use held in an open position when said first rubbing means is tilted on said vertical support; and second valve means attached to said second rubbing means and disposed adjacent the upper portion of said angular support, said second valve means communicably connected to said reservoir for feeding oil therefrom to said second rubbing means, said second valve means held in a closed position, said second valve means in use held in an open position when said second rubbing means is tilted on said angular support.

2. The oiler as described in claim 1, wherein the upper portion of said angular support is pivotally attached to the upper portion of said vertical support, the lower portion of said angular support is slidably mounted on said slide support so that said second rubbing means can be tilted by raising the lower portion of said angular support on said slide support.

3. The oiler as described in claim 2, further including a plurality of angular supports pivotally attached to said vertical support and slidably attached to vertical slide supports, said angular supports each having second valve means adjacent second rubbing means and communicably connected to said reservoir.

4. The oiler as described in claim 1, further including vertical and horizontal bracing attached to said vertical support and said vertical slide support.

5. The oiler as described in claim 4, wherein said vertical slide support includes an upper portion, a center portion, and a lower portion, the lower portion of said slide support pivotally attached to said horizontal bracing, the lower portion of said angular support slidably attached to said vertical slide support, the lower portion of said angular support normally disposed in the center portion of said vertical slide support, said angular support slidably moved upward and outward on the upper portion of said vertical slide support when said second rubbing means is in use.

6. The oiler as described in claim 1, wherein said first rubbing means includes a vertical hollow cylindrical rubbing tube disposed around the center portion of said vertical support, and said second rubbing means includes an angular hollow cylindrical rubbing tube disposed around the center portion of said angular support, said rubbing tubes having a layer of porous material disposed around the outer circumference thereof, the porous material being enclosed in an open mesh material.

7. The oiler as described in claim 6, wherein an upper end portion of said rubbing tubes includes an indention vent disposed below and adjacent to said first valve means and said second valve means for receiving oil therefrom and feeding the oil to said layer of porous material.

8. The oiler as described in claim 7, wherein said first and second valve means include:
a valve housing:
an intake port in said valve housing;
a conduit attached to said reservoir and said intake port for feeding oil to said housing;
a discharge port in said valve housing;
a plunger slidably mounted in said housing, said plunger having a first end portion, a second end portion and a flange portion therebetween, the first end portion extending through said discharge port and outwardly therefrom, the flange portion seated against the side of said discharge port when said first and said second valve means are in a closed position; and
spring biasing means mounted in said valve housing and disposed against the second end portion of said plunger for biasing the flange portion of said plunger against the sides of said discharge port.

9. The oiler as described in claim 8, wherein said first valve means includes two discharge ports disposed at each end of said valve housing and including two spring biased plungers with first end portions extending outwardly therefrom so that said first valve means is opened when said vertical rubbing tube is tilted in opposite directions.

10. The oiler as described in claim 9, wherein the first end portion of said spring biased plunger of said second valve means is positioned downwardly so that said second valve means is opened when said angular rubbing tube is tilted by raising said angular rubbing tube on said angular support.

11. A cattle oiler for treating of livestock, the oiler comprising:
a vertical support having an upper portion, a center portion, and a lower portion;
an angular support having an upper portion, a center portion, and a lower portion, the upper portion of said angular member pivotally attached to the upper portion of said vertical support, said angular support extending outwardly and downwardly from said vertical support;
a vertical slide support having an upper portion, a center portion, and a lower portion, the lower portion of said angular support slidably mounted on said vertical slide support, the lower portion of said angular support normally disposed in the center portion of said vertical slide support, said angular support slidably moved upward and outward on the upper portion of said vertical slide support;
vertical and horizontal bracing attached to said vertical support and said vertical slide support for supporting the cattle oiler on the ground surface, the lower portion of said slide support pivotally attached to said horizontal bracing;
a vertical hollow cylindrical rubbing tube, tiltably mounted on the upper portion of said vertical support;
an angular hollow cylindrical rubbing tube, tiltably mounted on the upper portion of said angular support, said rubbing tubes having a layer of porous material disposed around the outer circumference thereof, the porous material being enclosed in an open mesh material;
an oil reservoir mounted on top of said vertical support;
first valve means attached to the upper portion of said vertical support and disposed adjacent the inner circumference of said vertical rubbing tube, said first valve means communicably connected to said reservoir for feeding oil therefrom to said vertical rubbing tube, said first valve means held in a closed position, said first valve means in use held in an open position when said vertical rubbing tube is tilted on said vertical support; and
second valve means attached to said second rubbing means and disposed adjacent the upper portion of said angular support, said second valve means communicably connected to said reservoir for feeding oil therefrom to said angular rubbing tube, said second valve means held in a closed position, said second valve means in use held in an open position when said angular rubbing tube is tilted on said angular support.

* * * * *